United States Patent
Tamura et al.

(10) Patent No.: US 12,025,626 B2
(45) Date of Patent: Jul. 2, 2024

(54) SPECIMEN ANALYZER

(71) Applicant: Hitachi High-Tech Corporation, Tokyo (JP)

(72) Inventors: Riku Tamura, Tokyo (JP); Yuichiro Hashimoto, Tokyo (JP); Yuka Sugawara, Tokyo (JP); Hiroyuki Yasuda, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 334 days.

(21) Appl. No.: 17/628,367

(22) PCT Filed: Jul. 17, 2020

(86) PCT No.: PCT/JP2020/027967
§ 371 (c)(1),
(2) Date: Jan. 19, 2022

(87) PCT Pub. No.: WO2021/015148
PCT Pub. Date: Jan. 28, 2021

(65) Prior Publication Data
US 2022/0283193 A1    Sep. 8, 2022

(30) Foreign Application Priority Data
Jul. 25, 2019   (JP) .................. 2019-136790

(51) Int. Cl.
*G01N 35/00*  (2006.01)
*G01N 30/02*  (2006.01)
(Continued)

(52) U.S. Cl.
CPC ....... *G01N 35/00613* (2013.01); *G01N 30/02* (2013.01); *G01N 30/72* (2013.01);
(Continued)

(58) Field of Classification Search
CPC ......... G01N 35/00613; G01N 35/0092; G01N 30/86; G01N 30/02; G01N 30/74; G01N 30/88; G01N 2030/045; G01N 2030/8804
See application file for complete search history.

(56) References Cited

U.S. PATENT DOCUMENTS

2007/0134806 A1* 6/2007 Oda .................. G01N 33/6848
436/173
2011/0022326 A1* 1/2011 Oda .................. G01N 33/6848
702/19
(Continued)

FOREIGN PATENT DOCUMENTS

JP   2010-276568 A   12/2010
JP   2011-047956 A    3/2011
(Continued)

OTHER PUBLICATIONS

Extended European Search Report, mailed Jul. 12, 2023, for European Application No. 20844761.5.
(Continued)

*Primary Examiner* — Helen C Kwok
(74) *Attorney, Agent, or Firm* — Baker Botts L.L.P.

(57) ABSTRACT

There is provided a specimen analyzer that can measure carry-over without degrading a specimen processing capability. A specimen analyzer according to the present invention measures a first sample including a first specimen and a first internal reference material, subsequently measures a second sample including a second specimen and a second internal reference material, and calculates an amount of the second specimen included in the second sample using an amount of the first internal reference material measured when the first sample has been measured and an amount of the second internal reference material measured when the second sample has been measured.

9 Claims, 9 Drawing Sheets

| MEASUREMENT ORDER | 1 | 2 | 3 | ... |
|---|---|---|---|---|
| MEASUREMENT SAMPLE | SPECIMEN | SPECIMEN | SPECIMEN | ... |
| MEASUREMENT ITEM | A,IS1 | A,IS2+<u>IS1</u> | A,IS1+<u>IS2</u> | ... |
| ADDED INTERNAL REFERENCE MATERIAL | IS1 | IS2 | IS1 | ... |
| CARRY-OVER MEASUREMENT | | O(A) | O(A) | ... |

(51) Int. Cl.
  *G01N 30/72* (2006.01)
  *G01N 30/74* (2006.01)
  *G01N 30/86* (2006.01)
  *G01N 30/88* (2006.01)

(52) U.S. Cl.
  CPC ............ *G01N 30/74* (2013.01); *G01N 30/86* (2013.01); *G01N 30/88* (2013.01); *G01N 35/0092* (2013.01); *G01N 2030/8804* (2013.01)

(56) References Cited

U.S. PATENT DOCUMENTS

| | | |
|---|---|---|
| 2011/0101215 A1 | 5/2011 | Hirabayashi et al. |
| 2013/0260415 A1 | 10/2013 | Fukuda et al. |
| 2016/0305969 A1* | 10/2016 | Dey .................... C07B 59/001 |
| 2018/0218892 A1* | 8/2018 | Yamaguchi ......... H01J 49/0009 |
| 2020/0103380 A1 | 4/2020 | Maekawa et al. |

FOREIGN PATENT DOCUMENTS

| | | |
|---|---|---|
| JP | 2013-210249 A | 10/2013 |
| JP | 2013-253888 A | 12/2013 |
| JP | 2016-539322 A | 12/2016 |
| WO | WO 2009/123297 A1 | 10/2009 |
| WO | WO 2013/098169 A1 | 7/2013 |
| WO | WO 2016/103388 A1 | 6/2016 |
| WO | WO 2018/229811 A1 | 12/2018 |

OTHER PUBLICATIONS

Zeng, W., et al., A new approach for evaluating carryover and its influence on quantitation in high-performance liquid chromatography and tandem mass spectrometry assay, Rapid Communications in Mass Spectrometry, vol. 20, No. 4, pp. 635-640 (2006).

Clouser-Roche, A., et al., Beyond pass/fail: A procedure for evaluating the effect of carryover in bioanalytical LC/MS/MS methods, Journal of Pharmaceuticals and Biomedical Analysis, vol. 47, No. 1, pp. 146-155 (2008).

International Search Report, mailed Oct. 13, 2020, for International Application No. PCT/JP2020/027967.

* cited by examiner

FIG. 5

| MEASUREMENT ORDER | 1 | 2 | 3 | 4 | 5 | 6 | ... |
|---|---|---|---|---|---|---|---|
| MEASUREMENT SAMPLE | SPECIMEN | BLANK | SPECIMEN | BLANK | SPECIMEN | BLANK | ... |
| MEASUREMENT ITEM | A,IS | A | A,IS | A | A,IS | A | ... |
| ADDED INTERNAL REFERENCE MATERIAL | IS | | IS | | IS | | ... |
| CARRY-OVER MEASUREMENT | | O(A) | | O(A) | | O(A) | ... |

FIG. 6

| MEASUREMENT ORDER | 1 | 2 | 3 | ... |
|---|---|---|---|---|
| MEASUREMENT SAMPLE | SPECIMEN | SPECIMEN | SPECIMEN | ... |
| MEASUREMENT ITEM | A,IS1 | A,IS2+IS1 | A,IS1+IS2 | ... |
| ADDED INTERNAL REFERENCE MATERIAL | IS1 | IS2 | IS1 | ... |
| CARRY-OVER MEASUREMENT | | O(A) | O(A) | ... |

FIG. 7

| MEASUREMENT ORDER | 1 | 2 |
|---|---|---|
| MEASUREMENT SAMPLE | KNOWN CONCENTRATION DATA | BLANK |
| MEASUREMENT ITEM | A, IS1,IS2 | A, IS1,IS2 |
| ADDED INTERNAL REFERENCE MATERIAL | IS1,IS2 | |
| CARRY-OVER MEASUREMENT | | O (A,IS1,IS2) |

FIG. 8

| MEASUREMENT ORDER | 1 | 2 | 3 | ... |
|---|---|---|---|---|
| MEASUREMENT SAMPLE | SPECIMEN | SPECIMEN | SPECIMEN | ... |
| MEASUREMENT ITEM | A, IS(A) | B,IS(B) +IS(A) | C,IS(C) +IS(B) | ... |
| ADDED INTERNAL REFERENCE MATERIAL | IS(A) | IS(B) | IS(C) | ... |
| CARRY-OVER MEASUREMENT | | O(A) | O(B) | ... |

SPECIMEN ANALYZER

TECHNICAL FIELD

The present invention relates to a specimen analyzer that measures an amount of a specimen included in a sample.

BACKGROUND ART

A specimen analyzer is a device that measures an amount of a specimen included in a sample. In the specimen analyzer, contaminants of a specimen attached to the side surface of a needle that aspirates a sample, contaminants attached to a passage, contaminants that enter or covers a gap produced between connectors connecting a passage, and the like are sometimes detected when the specimen is analyzed later. This phenomenon is referred to as a carry-over. As a result, it is known that a measured value exceeds an original value to degrade measured accuracy.

Patent Literature 1 below describes a technique that cleans a needle and a passage after a specimen is measured, then blank measurement is performed, and the presence or absence of a carry-over is measured in order to avoid a carry-over. Patent Literature 2 below discloses a method that detects a high-value abnormality of the measured value of a measurement item to detect a carry-over.

SUMMARY OF INVENTION

Technical Problem

Patent Literature 1: Japanese Unexamined Patent Application Publication No. 2013-210249
Patent Literature 2: Japanese Unexamined Patent Application Publication No. 2010-276568

SUMMARY OF INVENTION

Technical Problem

In order to measure the presence or absence of a carry-over with the method described in Patent Literature 1, there is a necessity that blank measurement is inserted between specimen measurements and a measurement sequence similar to specimen measurement is separately performed. There is a problem that the insertion of blank measurement between specimen measurements prolongs standby time between specimen measurements resulting in degradation in specimen processing performances per hour.

In the method described in Patent Literature 2, since a carry-over is detected using the measured value of the measurement item, a faulty detection of a carry-over occurs depending on the concentration of the measurement item in a specimen, and this may raise a possibility that a cleaning process, which is originally unnecessary, is added, and a carry-over is again measured. As a result, a problem arises that specimen processing performances are degraded.

The present invention is made in view of the problems described above, and it is an object to provide a specimen analyzer that is capable of measuring a carry-over with no degradation in specimen processing performances.

Solution to Problem

A specimen analyzer according to the present invention measures a first sample including a first specimen and a first internal reference material, then measures a second sample including a second specimen and a second internal reference material, and calculates an amount of the second specimen included in the second sample using an amount of the first internal reference material measured when the first sample has been measured and an amount of the second internal reference material measured when the second sample has been measured subsequently to the first sample.

Advantageous Effects of Invention

In accordance with the specimen analyzer according to the present invention, it is possible to measure a carry-over with no degradation in specimen processing performances due to blank measurement and the like. Problems, configurations, and effects other than the ones described above will be apparent from the description of embodiments below.

BRIEF DESCRIPTION OF THE DRAWINGS

FIG. 5 is a table showing a process of carry-over measurement using a conventional blank sample.
FIG. 6 is a table showing a process of carry-over measurement according to the first embodiment.
FIG. 7 is a table illustrating procedures of obtaining correlation coefficients.
FIG. 8 is a flowchart illustrating a process of carry-over measurement in the case in which a plurality of measurement items is measured.

DESCRIPTION OF EMBODIMENTS

First Embodiment

Figure 1:
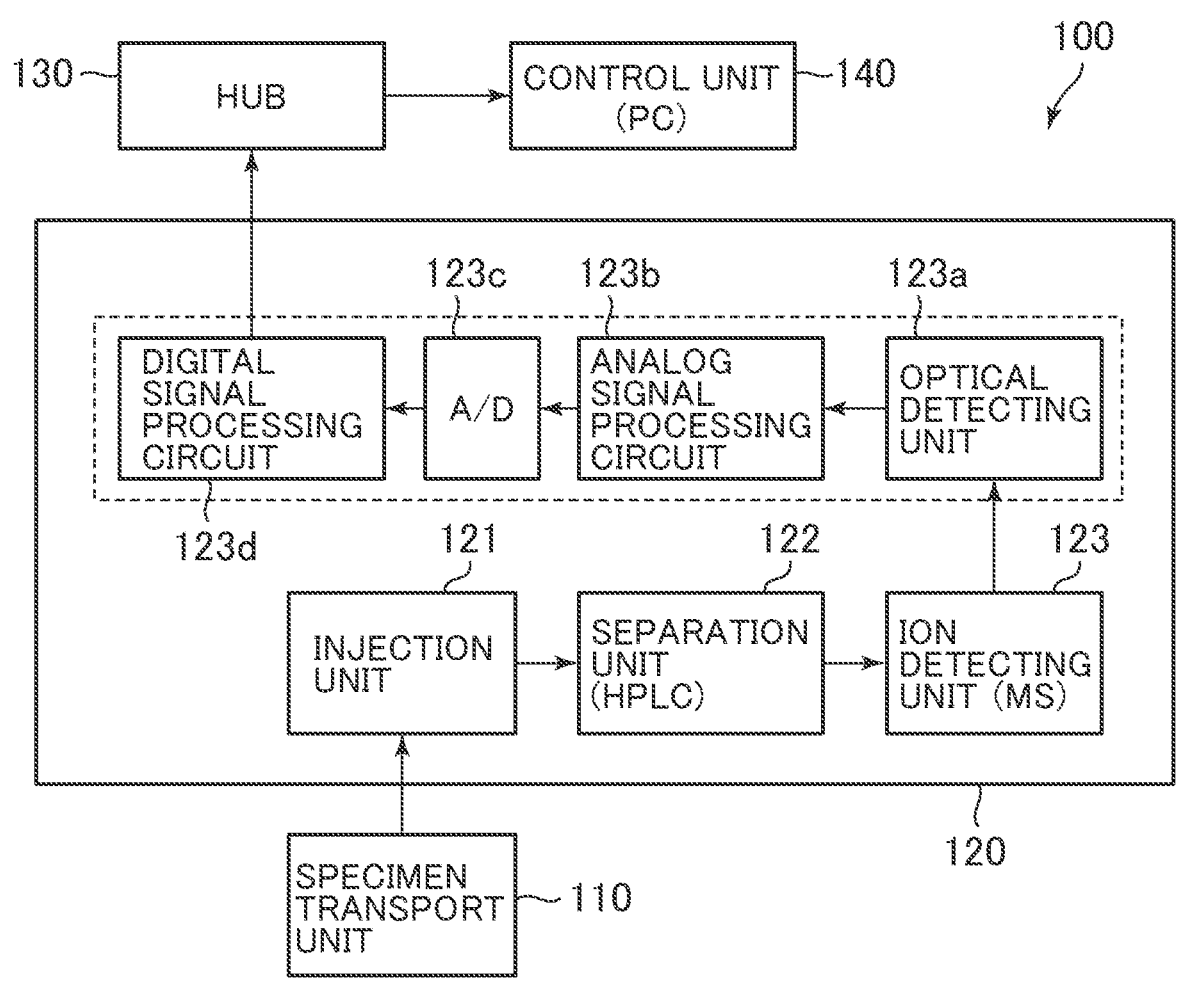
FIG. 1 is a block diagram showing the overall structure of a specimen analyzer according to a first embodiment.

FIG. 1 is a block diagram showing the overall structure of a specimen analyzer 100 according to a first embodiment of the present invention. The specimen analyzer 100 includes a specimen transport unit 110, a measurement unit 120, a hub 130, and a control unit 140. The specimen transport unit 110 transports a specimen to the measurement unit 120. The measurement unit 120 is a functional unit that measures an amount of a specimen. The control unit 140 controls the operation of the specimen analyzer 100. With procedures described later, a carry-over is measured.

The measurement unit 120 includes an injection unit 121, a separation unit 122, and an ion detecting unit 123. The injection unit 121 quantitatively aspirates the specimen transported by the specimen transport unit 110. The separation unit 122 separates materials according to the polarity of the material. The ion detecting unit 123 ionizes the separated material, and performs mass spectrometry.

The ion detecting unit 123 includes a photodetector 123a, an analog signal processing circuit 123b, an A/D converter 123c, and a digital signal processing circuit 123d. The photodetector 123a outputs an electrical signal corresponding to the concentration of particles to the analog signal processing circuit 123b. The analog signal processing circuit 123b amplifies the signal from the photodetector 123a, and performs filtering and the like. The A/D converter 123c converts the output from the analog signal processing circuit 123b into a digital signal. The digital signal processing circuit 123d applies a predetermined waveform process to the digital signal. The output of the digital signal processing circuit 123d is inputted to the control unit 140 through the hub 130.

Figure 2:
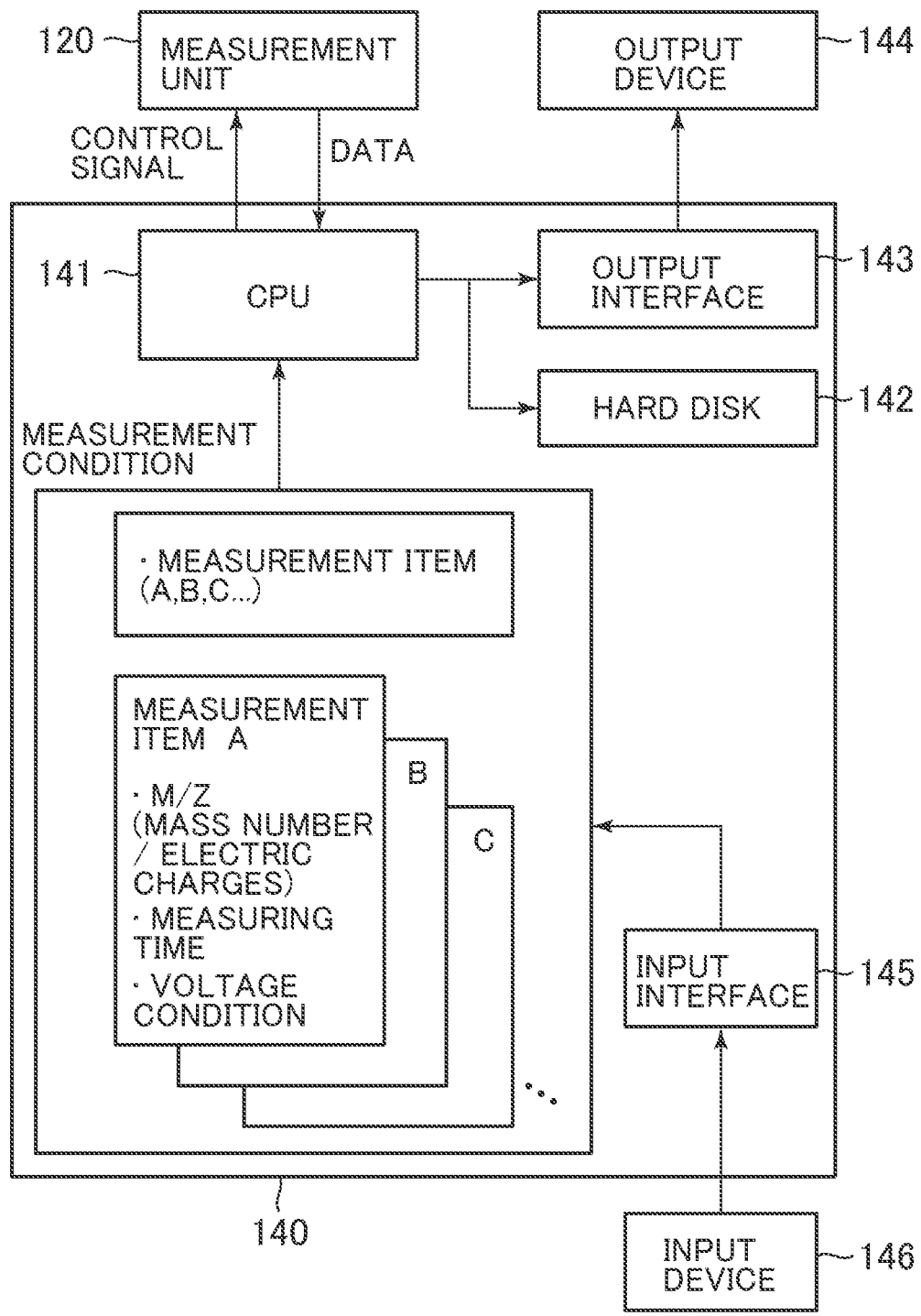
FIG. 2 is a functional block diagram of a control unit.

FIG. 2 is a functional block diagram of the control unit 140. To the measurement unit 120, a measurement condition is inputted as a control signal. The measurement condition includes the list of measurement items and the control values of the analyzer corresponding to various measurement items. As the control values, the voltage values of electrodes and measuring time are named. Since the mass spectrometer separates materials according to a ratio m/z of the mass number to electric charges, m/z is also inputted as a control value. m/z corresponds to the measurement item by one to one. The mass spectrometer switches the voltage at high speed to change m/z to be measured, and thus can switch measurement items in units of milliseconds. This switching is repeated during measurement at one time, and thus a plurality of different measurement items can be measured simultaneously. These measurement conditions can be freely changed by a user from the input device 146 through the input interface 145.

To the control unit 140, the detection signal of the photodetector 123a, which is processed by the digital signal processing circuit 123d, and a CPU 141 (Central Processing Unit) processes the detection signal. The control unit 140 records the signal amounts of various measurement items in a hard disk 142 together with measured time. The processed result is outputted on an output device 144 through an output interface 143.

Figure 3:
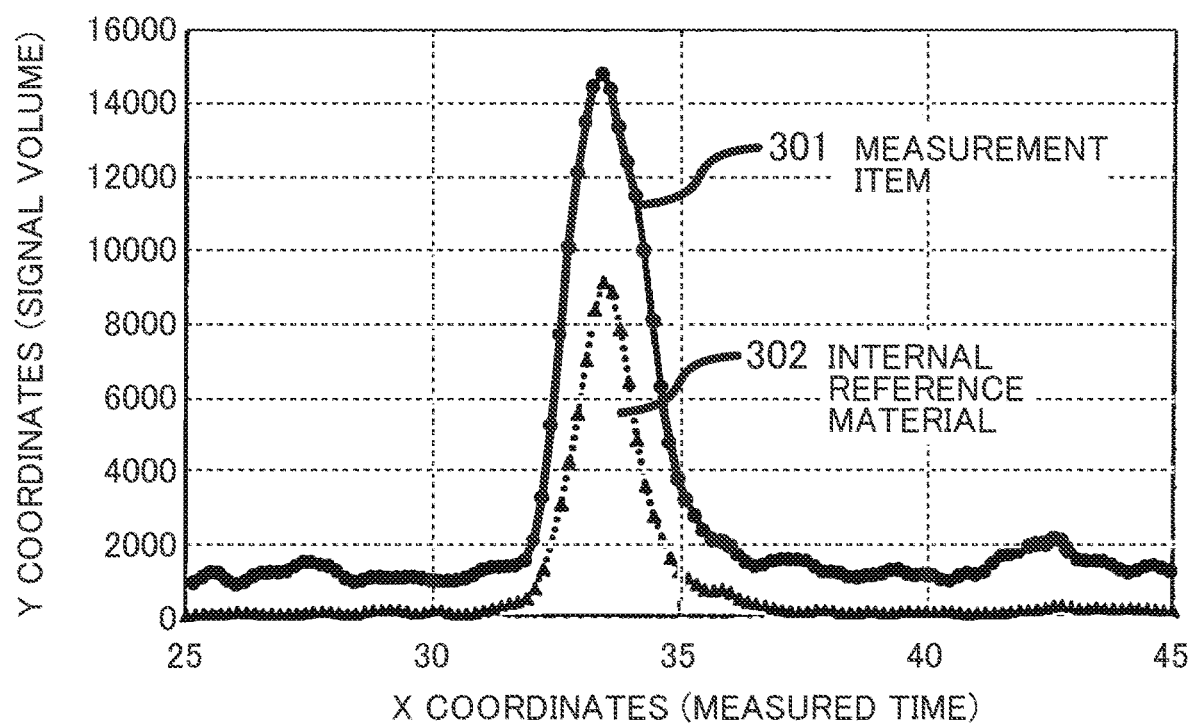
FIG. 3 is an exemplary chromatogram outputted by the control unit.

FIG. 3 is an example of a chromatogram outputted from the control unit 140. The control unit 140 creates a chromatogram in which the measured time is taken on the X-axis and the signal amount is taken on the Y-axis, and displays the chromatogram on the output device 144 through the output interface 143. The control unit 140 may further integrate the peak area of the chromatogram to calculate the total signal amount for obtaining the elution time of the peak and the like. For example, when the quantitative analysis of a measurement item A is performed, the peak area of the measurement item 301 is compared with the peak area of an internal reference material 302 having a known concentration, and thus quantitative analysis of high accuracy can be performed. The detailed procedures will be described later.

Figure 4:
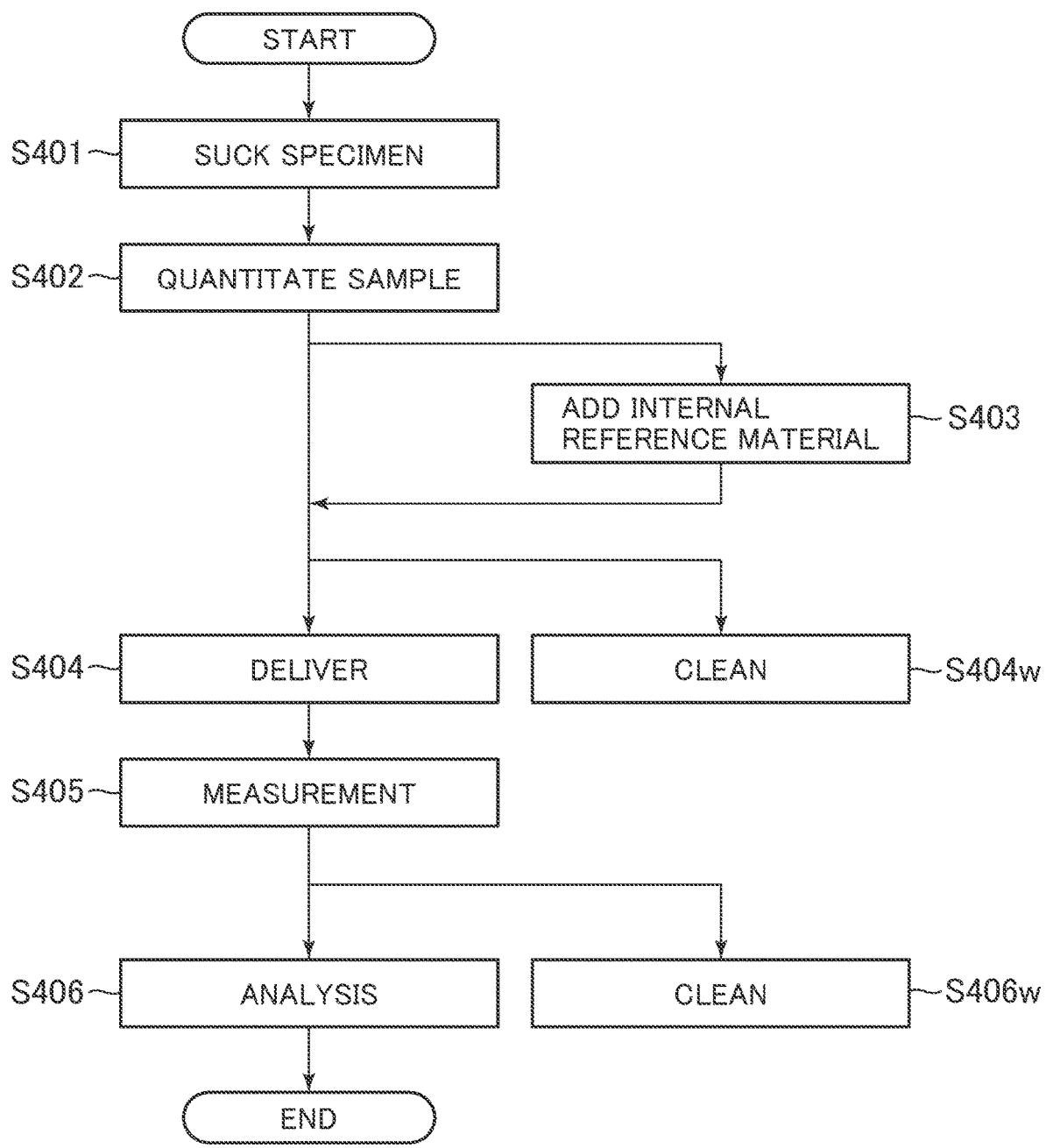
FIG. 4 is a flowchart illustrating a specimen measurement sequence for one time using the specimen analyzer.

FIG. 4 is flowchart illustrating a specimen measurement sequence at one time using the specimen analyzer 100. A specimen transported by the specimen transport unit 110 is aspirated by the injection unit 121 (S401), and the aspirated specimen is quantitated (S402). In the case in which the measurement of the internal reference material is specified, the internal reference material is similarly aspirated and quantitated, and added to the specimen (S403). The use of the internal reference material will be described later. The specimen to which the internal reference material is added is injected into the separation unit 122 for delivery. After the termination of injection, the injection unit 121 is cleaned until the subsequent specimen measurement sequence is started (S404w). The specimen delivered to the separation unit 122 is separated according to the polarity of a component, and is delivered to the ion detecting unit 123 (S404). The ion detecting unit 123 measures the delivered specimen (S405). The ion detecting unit 123 and the control unit 140 analyze the measured result, and display the result on the output device 144 (S406). The passage through which the specimen is carried is cleaned in any time from eh end of measurement to the start of measurement (S406w).

FIG. 5 is a table showing the process of measurement of a carry-over using a conventional blank sample. Here, the case is shown in which one measurement item A is continuously measured. The internal reference material to be added is written in IS. The term "measurement order" indicates a time sequence, in which measurement is performed from a small number to a large number. In the measurement order, the specimen measurement sequence shown in FIG. 4 is performed, and the total signal amount of the specified measurement item (the integral value of the peak of the signal amount exemplified in FIG. 3) can be obtained as measurement data.

The total signal amount of the measurement item A in order i is set as Int(i, A). In the case in which a carry-over occurs, the effect of the carry-over appears as an increase in the total signal amount in the subsequent measurement order and later. The signal increase amount is set as a carry-over signal amount $\Delta(1, A)$. The ratio of the signal amount of the measurement order of a carry-over destination to the signal amount of the measurement order of a carry-over source is set as a carry-over ratio CO(1, A). When the conventional carry-over measured method in FIG. 5 is taken as an example, the carry-over signal amount of the measurement item A and the carry-over ratio of order 1 to order 2 is expressed by Expression 1 below, since the sample in order 2 is blank.

[Mathematical formula 1]

$$\mathrm{Int}(2,A)=\Delta(1,A)=CO(1,A)\cdot\mathrm{Int}(1,A) \quad (1)$$

In the conventional carry-over measured method using a blank sample, the carry-over ratio CO(i, A) of the measurement item A in order i is given by a ratio between the total signal amount Int(i, A) of the measurement item A when the specimen is measured in order i and the total signal amount of the measurement item A when the blank sample is measured in order i+1. That is, the carry-over value is calculated by Expression 2 below, where i expresses the order when the specimen is measured.

[Mathematical formula 2]

$$CO(i, A) = \frac{Int(i + 1, A)}{Int(i, A)} \quad (2)$$

FIG. 6 is a table showing the process of carry-over measurement in the first embodiment. Similarly to FIG. 5, the case is shown in which one measurement item A is continuously measured. Two types of internal reference materials to be added are written in IS1 and IS2.

In the first embodiment, the carry-over amount of the measurement item A is measured using the total signal amount of the internal reference material. When the carry-over ratio of the measurement item A measured in the first embodiment in order 1 to order 2 is set as CO_NEW (1, A), CO_NEW (1, A) is expressed by Expression 3 below.

[Mathematical formula 3]

$$CO\_NEW(1, A) = J_{A,IS1} \cdot \frac{Int(2, IS1)}{Int(1, IS1)} \quad (3)$$

The carry-over signal amount Δ(1, A) can be calculated by Expression 4 below.

[Mathematical formula 4]

$$\Delta(1,A) = CO\_NEW(1,A) \cdot Int(1,A) \quad (4)$$

$J_{A,IS1}$ expresses the correlation coefficient between the carry-over value of the measurement item A and the carry-over ratio of the internal reference material IS1. It is considered that the carry-over amount of the measurement item and the carry-over amount of the internal reference material have the correlation relationship. Therefore, it is assumed that the carry-over ratio of the measurement item and the carry-over ratio of the internal reference material also similarly have the correlation relationship. In the first embodiment, this relationship is to be expressed as a correlation coefficient. The correlation coefficient is expressed as the ratio of the carry-over ratio of the measurement item to the carry-over ratio of the internal reference material. For example, $J_{A,IS1}$ is expressed by Expression 5 below.

[Mathematical formula 5]

$$J_{A,IS1} = \frac{CO(1, A)}{CO(1, IS1)} \quad (5)$$

In the conventional procedures described in FIG. 5, the blank sample has to be measured while the specimen is measured. To this, in the first embodiment intends that the carry-over amount of the internal reference material is measured to calculate the carry-over amount of the measurement item A via the correlation coefficient described above. In the first embodiment, as shown in FIG. 6, the measurement item of the internal reference material IS1 added in previous order 1 is added to order 2, and thus the blank measurement of the internal reference material IS1 is substantially similarly performed in order 2.

FIG. 7 is a table describing the procedures of obtaining the correlation coefficient. In order to measure the carry-over amount according to FIG. 6, a correlation coefficient $J_{A,X}$ (X=IS1, IS2) is necessary. The correlation coefficient $J_{A,X}$ can be obtained by measuring the carry-over amount of the measurement item A and the carry-over amounts of the internal reference materials through the conventional carry-over measurement procedures as in FIG. 7. Since the correlation coefficient $J_{A,X}$ is defined as the ratio between two carry-over ratios as shown in Expression 5, the dependence on the measurement order is removed. That is, the correlation coefficient is a constant that does not depend on the measurement order. Therefore, it is enough to measure the correlation coefficient $J_{A,X}$ once.

In the example above, use of two internal reference material is described. This is performed to enable the measurement of the carry-over between all the adjacent orders by alternately using two internal reference materials. When types of internal reference materials are increased, the carry-over can also be measured between the adjacent orders as well as between distant orders. For example, in the case in which it is desired to measure a carry-over from order 1 to order N, when the internal reference material (IS1) in order 1 is not used as the internal reference material from order 2 to order N, IS1 is again measured in order N, and thus the carry-over can be measured. N is an integer of two or more. The first embodiment shows the case of N=2.

A supplementary explanation is made that the correlation coefficient does not depend on the measurement order. It is considered that the carry-over amount of the internal reference material IS1 in measurement order 1 to measurement order 3 is smaller than the carry-over amount in measurement order 1 to measurement order 2. This is because the carry-over amount typically decreases with time. On the other hand, at this time, it is considered that the carry-over amount of the measurement item A in measurement order 1 to measurement order 3 also similarly decreases with time. Therefore, in the present invention, it was assumed that the carry-over ratio CO(i, IS1) of the internal reference material IS and the carry-over ratio of the measurement item A CO(i, A) are always aged at the same ratio. Under this assumption, it is considered that the ratio between both always becomes the same numeric value regardless of the measurement order. Therefore, it is possible to use the same correlation coefficient with the use of Expression 5, regardless of the measurement order. In other words, it is possible to remove the dependence on the measurement order.

Since the correlation coefficient has a significance of no dependence on the measurement order, when a similar function is provided, the correlation coefficient may be obtained with a calculation expression or a function other than Expression 5. Conversely, when the correlation coefficient depends on the measurement order, the correlation coefficient may be obtained for every combination of measurement orders, and a correlation coefficient corresponding to the measurement order may be used.

The numeric value of the correlation coefficient is supplementarily described. As the numeric value of the correlation coefficient $J_{A,X}$ is greater, the carry-over can be measured highly accurately. In the case in which the numeric value of $J_{A,X}$ is small, the carry-over amount has no correlation between the internal reference material and the measurement item, and the carry-over amount is hardly measured with the method according to the first embodiment. Therefore, it is necessary to an appropriate material having a large correlation coefficient as the internal reference material.

In accordance with the carry-over measured method according to the first embodiment, as the measured value of the carry-over, two values, the signal increase amount Δ(i, A) and CO_NEW (i, A) that is a ratio from the previous measured amount, can be obtained. In regard to the presence or absence of a carry-over, the threshold is compared with the measured value as in the conventional method. When the measured value exceeds the threshold, it can be regarded that the carry-over amount exceeds the tolerance. In this case, any of Δ(i, A) and CO_NEW (i, A) may be compared with the threshold. In the case in which it is regarded that the carry-over amount exceeds the tolerance in comparison of these measured values are compared with the threshold, the control unit 140 can output an alert and the like expressing this excess.

Conclusion of First Embodiment

In the specimen analyzer 100 according to the first embodiment, after the first sample including the measurement item A and the internal reference material IS1 is measured, the second sample including the measurement item A and the internal reference material IS2 is measured, and be carry-over amount of the measurement item A is measured using the signal amount of the internal reference material IS1 at the time of measurements. As a result, it is unnecessary to measure the blank sample between specimen measurements like the conventional technique, and thus it is possible to more efficiently perform continuous measurement of a specimen.

In the specimen analyzer 100 according to the first embodiment, the carry-over amount of the measurement item A is measured using the correlation coefficient $J_{A,IS1}$ expressing the relationship between the carry-over ratio of the measurement item A CO(1, A) and the carry-over ratio of the internal reference material IS1 CO(1, IS1). As a result, it is possible to measure the carry-over amount of the measurement item A using the correlation coefficient that is measured once with no dependence on the measurement order. When the carry-over amount becomes known, the carry-over amount is subtracted from the measured result, and thus it is possible to calculate the precise amount of the measurement item A.

Second Embodiment

The carry-over measurement procedures described in the first embodiment can also be used for measuring the carry-over of the measurement items in the case in which a plurality of measurement items is measured. In a second embodiment of the present invention, a specific example will be described. The configuration of the specimen analyzer 100 is similar to the first embodiment.

FIG. 8 is a table describing the process of measuring the carry-over in the case in which a plurality of measurement items is measured. The measurement items are written in A, B, and C, and internal reference materials to be added are written in IS(A), IS(B), and IS(C). Here, it is assumed that a sample includes all the measurement items A, B, and C and in the measurement orders, A, B, and C are measured one by one. Similarly to the first embodiment, in a method of measuring a carry-over, the ratio of the signal amount of the internal reference material is multiplied by the correlation coefficient between order i and order i+1. That is, the carry-over ratio of the measurement item A between order 1 and order 2 is expressed by Expression 6 below.

[Mathematical formula 6]

$$CO\_NEW(1, A) = J_{A,IS(A)} \cdot \frac{Int(2, IS(A))}{Int(1, IS(A))} \quad (6)$$

The carry-over in order 1 to order 2 is considered on the measurement item B. In order 1, since the item B is not a measurement item, Int(1, B) is unknown. Therefore, it is not possible to obtain a carry-over signal amount Δ(1, B) with a calculation expression similar to Expression 1. However, a carry-over ratio CO_NEW (1, B) can be obtained by acquiring IS(A) and a correlation coefficient $J_{B,IS(A)}$ of the assumed item B beforehand. That is, the carry-over ratio of the measurement item B between order 1 and order 2 is expressed by Expression 7 and Expression 8 below.

[Mathematical formula 7]

$$CO\_NEW(1, A) = J_{B,IS(A)} \cdot \frac{Int(2, IS(A))}{Int(1, IS(A))} \quad (7)$$

[Mathematical formula 8]

$$J_{B,IS(A)} = \frac{CO(1, B)}{CO(1, IS(A))} \quad (8)$$

The control unit 140 can determine whether the carry-over of the measurement item B is within the tolerance in which the carry-over ratio of the measurement item B is calculated according to Expression 7 and Expression 8 and is compared with the threshold. When the carry-over of B is within the tolerance, the measured result of B (the signal amount) in measurement order 2 only has to be adopted as it is. Alternatively, when the carry-over of B exceeds the tolerance, for example, the control unit 140 outputs an alert expressing the excess to prompt cleaning, re-measurement, or the like.

Similarly, the correlation coefficient $J_{C,IS(A)}$ is measured, and thus it is also possible to obtain the carry-over ratio on the item C. Similarly, the correlation coefficient $J_{X,Y}$ (X=A, B, C, Y=IS(A), IS(B), IS(C)) is obtained on all the combinations of the measurement items A, B, and C and the internal reference material IS(A), IS(B), and IS(C), and thus it is possible to obtain the carry-over ratio on all the measurement items in given orders.

Conclusion of Second Embodiment

In the specimen analyzer 100 according to the second embodiment, the carry-over ratio of the measurement item B (Expression 7) is calculated according to the correlation relationship (Expression 8) between the carry-over ratio CO(1, IS(A)) of the internal reference material IS(A) in measurement 1 to 2 and the carry-over ratio of the measurement item B CO(1, B) in measurement 1 to 2. As a result, also in the case in which two or more measurement items are measured, similarly to the first embodiment, it is possible to measure a carry-over without measuring the blank sample.

The technique according to the second embodiment is generally applicable in the case in which the measurement items are tow types or more. Similarly, the internal reference material is not limited to three types. Two types or more internal reference materials that can be alternately measured like the first embodiment corresponding to the number of the measurement items.

Third Embodiment

The techniques described in the first to the second embodiments, desirably, the correlation coefficient is large enough to the measurement items A to C and has a small difference between the measurement items. In a third embodiment of the present invention, an example taking into consideration of this point will be described. The configuration of a specimen analyzer 100 is similar to the first to the second embodiments.

Figure 9:
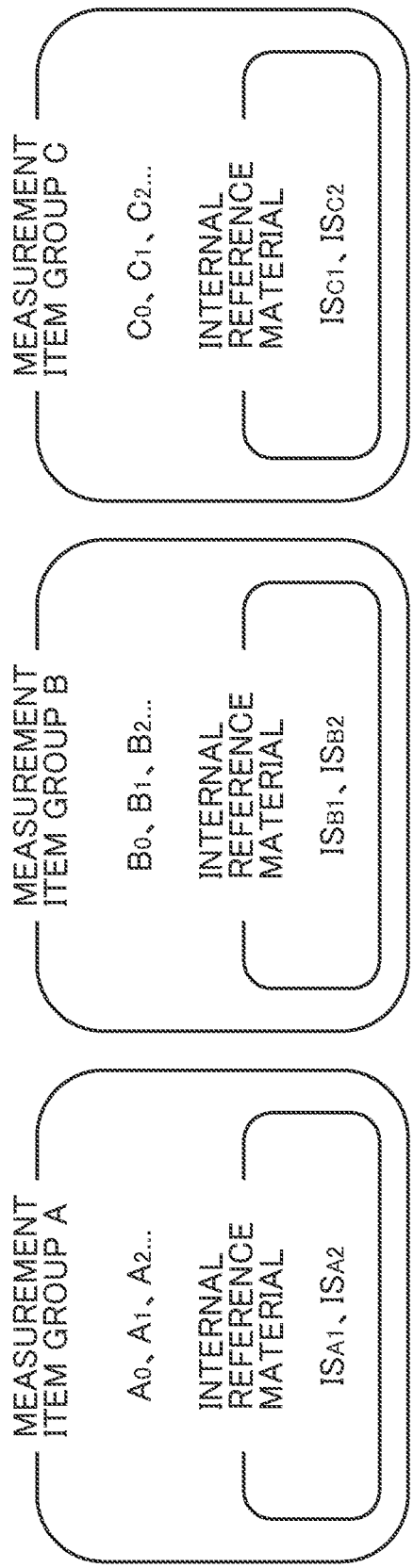
FIG. 9 is a conceptual diagram showing exemplary corresponding relationships between measurement items and internal reference materials in carry-over measurement on a large number of measurement items.

FIG. 9 is a conceptual diagram showing an example of a correspondence relationship between measurement items and internal reference materials when a carry-over is measured to a large number of measurement items. In the third embodiment, the same types of measurement items were sorted as a measurement item group. To the measurement item groups, corresponding internal reference materials were allocated for two each. When the items of the measurement item groups are measured, the internal reference material allocated to the measurement item group is added to a sample. In the case in which the measurement items belonging to the same measurement item group are continuously measured, similarly to the first embodiment, two internal reference samples corresponding to the measurement item group are alternately added. In the case in which measurement is performed across the measurement item groups (e.g., in the case in which the item A0 is measured and subsequently the item B0 is measured), similarly to the second embodiment, the internal reference material IS(A1 or A2) and the internal reference material IS(B1 or B2) are sequentially added.

When the measurement item groups and the corresponding internal reference materials are sorted, the measurement item groups and the internal reference materials are sorted such that the correlation coefficient for each measurement item group is large enough and has a close value. With the sorting in this manner, it is possible to measure a carry-over efficiently as well as it is possible to decrease the number of types of internal reference materials for use.

Exemplary Modifications of the Present Invention

In the embodiments above, the description is made in which a carry-over is measured using the internal reference material. However, the internal reference material can be used for another application together with the carry-over measurement. For example, as in FIG. 3, the measured signal amounts of the measurement item 301 and the internal reference material 302 are obtained, and then the signal amount of the measurement item 301 can be corrected using the signal amount of the internal reference material 302. For example, when it can be regarded that the ratio between the two signal amounts is constant, the signal amount of the measurement item 301 can be corrected using the signal amount of the internal reference material 302.

In the embodiments above, Step S403 may be performed after quantitative aspiration in Step S402, or the internal reference material may be mixed in advance to the specimen as the front end in this case, Step S403 is unnecessary.

In the embodiments above, the measurement item and the internal reference material are optional, as long as the measurement item and the internal reference material are measurable by the ion detecting unit 123. For example, Testosterone, Estradiol, and Cortisol, which are hormones, are usable.

LIST OF REFERENCE SIGNS

110: specimen transport unit
120: measurement unit
121: injection unit
122: separation unit
123: ion detecting unit
123a: photodetector
123b: analog signal processing circuit
123c: A/D converter
123d: digital signal processing circuit
130: hub
140: control unit
141: CPU
142: hard disk
143: output interface
144: output device
145: input interface
146: input device

What is claimed is:

1. A specimen analyzer that measures an amount of a specimen including in a sample, the specimen analyzer comprising:
   a measurement unit configured to measure the sample and output a measurement signal indicating the amount of the specimen; and
   a control unit configured to calculate the amount of the specimen using the measurement signal,
   wherein: when a first specimen is measured, the measurement unit measures a first sample including the first specimen and a first internal reference material;
   when a second specimen is measured, the measurement unit measures a second sample including the second specimen and a second internal reference material that is different from the first internal reference material; and
   the control unit calculates an amount of the second specimen included in the second sample by using a first carry-over amount of the first specimen carried from the first sample to the second sample, wherein the first carry-over amount is calculated by using an amount of the first internal reference material measured when the first sample has been measured and an amount of the second internal reference material measured when the second sample has been measured subsequently to the first sample.

2. The specimen analyzer according to claim 1,
wherein the control unit calculates an amount of the second specimen included in the second sample by calculating the first carry-over amount according to a first correlation between a ratio of the first specimen carried from the first sample to the second sample and the first internal reference material carried from the first sample to the second sample.

3. The specimen analyzer according to claim 2,
wherein the control unit calculates the first carry-over amount using a function that depends on the first correlation that is independent of the measurement order of the first and second sample.

4. The specimen analyzer according to claim 3,
wherein the control unit uses, as the first correlation, the function that uses the ratio of the first specimen carried from the first sample to the second sample as a first variable and uses a ratio of the first internal reference material carried from the first sample to the second sample as a second variable.

5. The specimen analyzer according to claim 2,
wherein: the measurement unit outputs a first measurement signal indicating a result of measuring an amount of the first specimen included in the first sample and the measurement unit outputs a second measurement signal indicating a result of measuring an amount of the second specimen included in the second sample;
the control unit calculates a ratio of the first specimen carried from the first sample to the second sample as a first carry-over rate;
the control unit calculates a ratio of the first internal reference material carried from the first sample to the second sample as a second carry-over rate;
the control unit calculates a ratio of the first carry-over rate to the second carry-over rate as a first correlation coefficient; and
the control unit calculates an amount of the second specimen included in the second sample using the first correlation coefficient, the first measurement signal, and the second measurement signal.

6. The specimen analyzer according to claim 5,
wherein: the measurement unit measures a specified sample including the first specimen in a specified amount, the first internal reference material, and the second internal reference material;
the measurement unit measures a blank sample that does not include any of the first specimen, the first internal reference material, and the second internal reference material; and the control unit calculates the first correlation coefficient using a measured result of the specified sample and a measured result of the blank sample.

7. The specimen analyzer according to claim 5, wherein: the first specimen and the second specimen are substances different from each other;

the first sample includes the second specimen in addition to the first specimen and the first internal reference material;

the control unit acquires a second correlation between a ratio of the second specimen carried from the first sample to the second sample and a ratio of the first internal reference material carried from the first sample to the second sample before the measurement of the first sample; and the control determines whether the ratio of the second specimen carried from the first sample to the second sample exceeds a threshold.

8. The specimen analyzer according to claim 7, wherein: the measurement unit outputs a third measurement signal indicating a result of measuring an amount of the first specimen included in the first sample, and the measurement unit outputs a result of measuring a fourth measurement signal indicating an amount of the first specimen included in the second sample;

the control unit calculates a ratio of the second specimen carried from the first sample to the second sample as a third carry-over rate;

the control unit calculates a ratio of the first internal reference material carried from the first sample to the second sample as a fourth carry-over rate;

the control unit calculates a ratio of the third carry-over rate to the fourth carry-over rate as a second correlation coefficient; and the control unit calculates a ratio of the second specimen carried from the first sample to the second sample using the second correlation coefficient, the third measurement signal, and the fourth measurement signal.

9. The specimen analyzer according to claim 1, wherein: the specimen analyzer is configured to measure a first specimen group to which the first specimen and the second specimen belong and configured to measure a second specimen group to which a third specimen and a fourth specimen belong;

when the third specimen is measured, the measurement unit measures a third sample including the third specimen and a third internal reference material;

when the fourth specimen is measured, the measurement unit measures a fourth sample including the fourth specimen and a fourth internal reference material;

the control unit calculates an amount of the fourth specimen included in the fourth sample using an amount of the third internal reference material measured when the third sample has been measured and an amount of the fourth internal reference material measured when the fourth sample has been measured;

when a first specimen group sample belonging to the first specimen group is measured, the measurement unit performs measurement such that any one of the first internal reference material or the second internal reference material is alternately included in the first specimen group sample every time when measurement is performed; and when a second specimen group sample belonging to the second specimen group is measured, the measurement unit performs measurement such that any one of the third internal reference material or the fourth internal reference material is alternately included in the second specimen group sample every time when measurement is performed.

* * * * *